Jan. 25, 1927.
A. G. STUEDEMAN
1,615,557
RETURN FEEDER FOR CONTINUOUS FEED JOINTERS
Filed Jan. 12, 1925     4 Sheets-Sheet 3
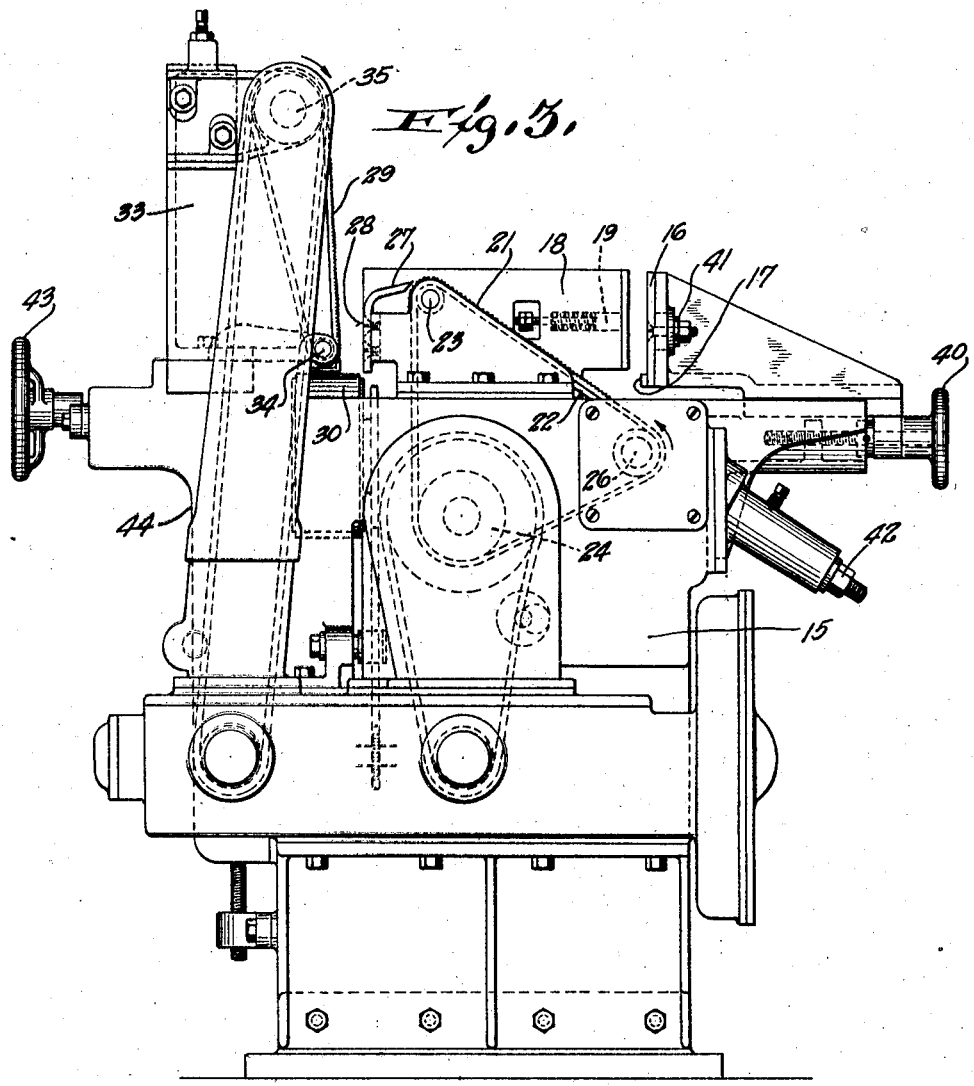
WITNESSES
INVENTOR.
ATTORNEY.

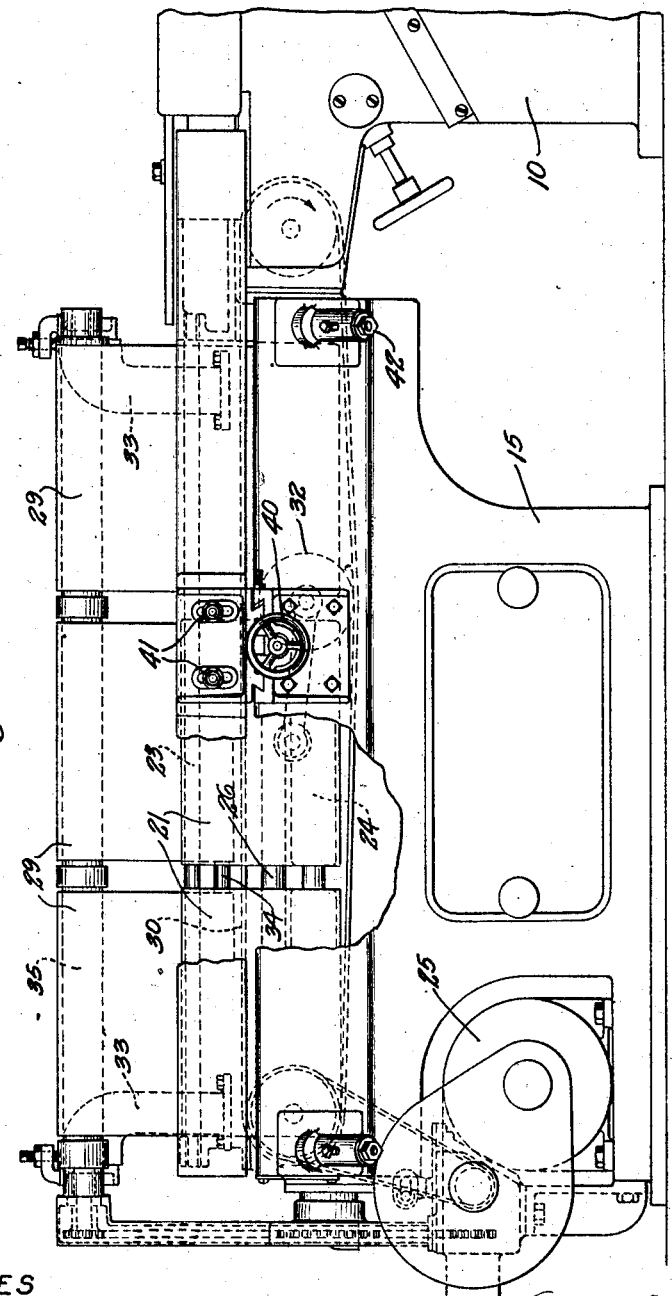

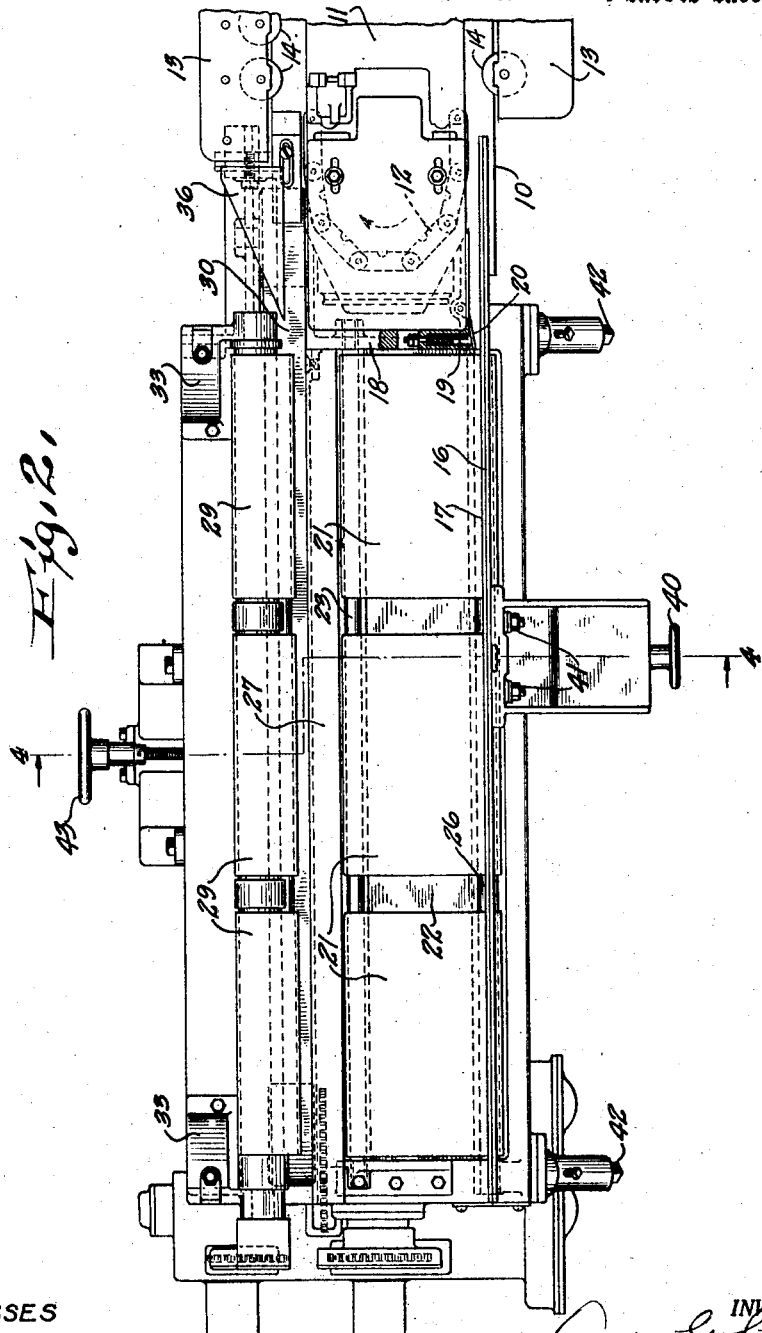

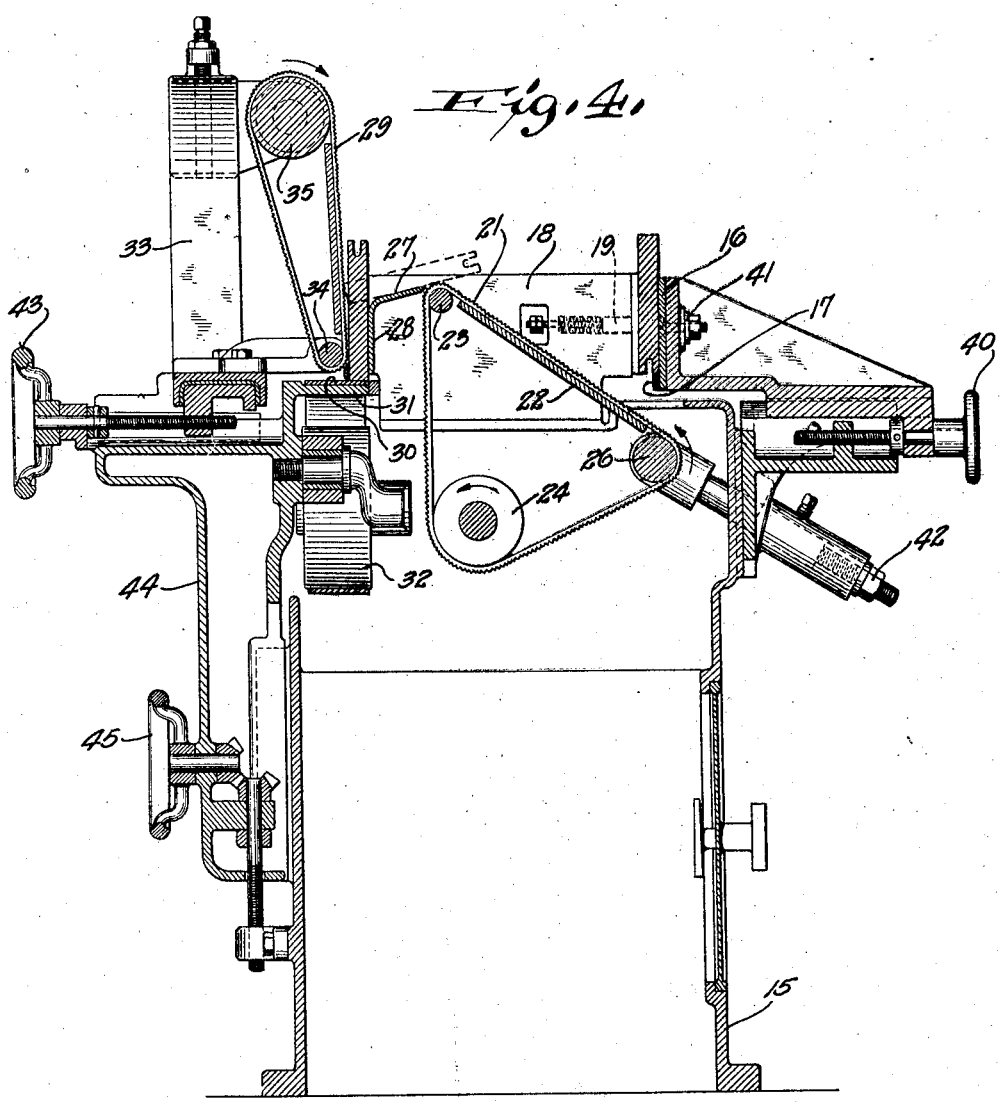

Patented Jan. 25, 1927.

1,615,557

UNITED STATES PATENT OFFICE.

ANTON G. STUEDEMAN, OF SHEBOYGAN, WISCONSIN, ASSIGNOR, BY MESNE ASSIGNMENTS, TO JENKINS MACHINE COMPANY, OF SHEBOYGAN, WISCONSIN, A CORPORATION OF WISCONSIN.

RETURN FEEDER FOR CONTINUOUS-FEED JOINTERS.

Application filed January 12, 1925. Serial No. 1,956.

This invention has for its object to provide mechanism for use as an attachment to continuous feed jointers for inverting the work after it has passed through the jointer in one direction to receive a tongue or groove on one edge and presenting it to the return feed of the machine for travel in the opposite direction to receive a tongue or groove on the other edge.

The invention is particularly designed as an attachment for such glue jointers as are disclosed in the Letters Patent to Peter J. Joecken for jointing machines, No. 857,071, dated June 18, 1907, though applicable to other machines of a similar character.

The invention has for its object to accomplish the transfer of the work from one work-feed passageway to the other by means of traveling belts on which it falls when released from the clamping action of the side bars of the jointer and it further has for its object to accomplish the turning of the work so as to bring its cut edge uppermost by causing it to drop off of such conveyer belts with its uncut edge lowermost.

Another object of the invention is to facilitate the action of inverting the work by causing it to engage a downwardly traveling belt in the path of its travel on the conveyer belt.

Another object of the invention is to perfect details of construction of such a return feeder.

With the above and other objects in view the invention consists in the return feeder for continuous feed jointers as herein claimed and all equivalents.

Referring to the accompanying drawings, in which like characters of reference indicate like parts in different views;

Figure 1 is a front view of a return feeder constructed in accordance with this invention;

Fig. 2 is a plan view thereof;

Fig. 3 is an end view thereof, and

Fig. 4 is a transverse sectional view on the plane of line 4—4 of Fig. 2.

In these drawings, 10 indicates a glue jointer of the continuous feed type with which the return feed mechanism of this invention is intended to function, such machines usually having a central stationary head block 11, through which passes a feed chain 12 for conveying strips of lumber through a pair of work feed passageways formed between the opposite faces of said head block and adjustable side bars 13 equipped with spring-pressed presser rolls 14 for holding the work with pressure against the faces of the head block during its travel on edge past matching cutters (not shown) for cutting the tongues and grooves therein.

Such machines, when served by hand, require the presence of an operator to receive the strips of work of varying length as they leave the jointer after having traveled through it in one direction to receive a tongue or groove on one edge, the operator then turning the work on its other edge and returning it to the other work-feed passageway of the machine to travel back through the machine and receve a tongue or groove on its other edge.

Considerable difficulty has been met with in attempts to mechanically perform this work owing to the fact that the strips of work are not usually of uniform length but vary in length from ten inches to ten feet. With the present invention the strips passing out of the first work-feeding passageway drop upon a continuously moving inclined conveyer belt so that they are immediately removed from the path of the following strip irrespective of length and, when deposited in an inverted position in the return passageway, they are immediately conducted by a conveyer belt to the return feed of the matching machine. Furthermore, provision is made for detaining a piece of work at the upper end of the inclined conveyer until the return passageway is clear of the piece of work that precedes it.

The return feed mechanism is shown as constituting an attachment for a well-known type of machine, although it may be incorporated in the matching machine. The base 15 thereof has horizontally adjustably mounted on it a vertical guide 16, which, by its horizontal and pivotal adjustments 40 and 41, is adapted to be aligned with the outer wall of the first work feed passageway through the jointer and constitute a continuation thereof against which the board or piece of lumber of whatever length will bear as it issues from said work feed passageway after having had the first matching cutter operation thereon. This guide 16, as best seen in Fig. 4, is provided with a narrow ledge 17, upon which the work bears as it issues from the jointer. In a vertical cross partition 18 of the frame is a spring-pressed bolt 19 bearing against a hinged plate 20, which is thereby caused to bear against the inner face of the work and hold it against the guide 16, but as soon as one piece of work passes beyond the edge of the plate 20 by the pressure of the piece of work following it, it is no longer supported at its inner face and consequently, because of the narrowness of the ledge 17, it falls inwardly upon an inclined conveyer belt 21. The belt 21 is preferably formed of sheet rubber with corrugated surface and desirably in a number of sections as shown and re-enforced by a stationary back plate 22 so that the work is carried upwardly thereby and toward the return passageway. This sectional apron passes around a guide roller 23, a driving roller 24 having suitable driving connection from a motor 25 and a tensioning roller 26 adjustable at 42 for maintaining the tension on the apron. At the upper end of the inclined apron there is an oppositely inclined guide 27 of a vertical guide wall 28, which is in line with the rear bearing face of the head block 11 of the matcher, while a downwardly traveling conveyer belt 29, also preferably of corrugated sheet rubber and formed in sections as shown, constitutes the rear wall of what is in effect a prolongation of the return feed passageway through the jointer, the bottom or floor of said passageway being formed by a conveyer belt 30 traveling on a flat bearing surface 31 of a bracket frame 44 having vertical adjustment 45 on the main frame. This conveyer belt is suitably driven from the motor 25 and is held tensioned by a belt tightener 32. The downwardly traveling apron 29 is mounted on a bracket frame 33, which is adjustable horizontally by the adjustment 43 so as to adapt it to the adjustments of the side bar of the jointer according to the thickness of the work being operated upon and said apron passes around a guide roller 34 on said bracket frame and a driving roller 35 having suitable driving connection with the motor 25 that will permit of the adjustments.

In operation the work which falls off of the ledge 17 when released by the spring-pressed plate 20 drops upon the inclined conveyer 21 and is carried up thereby until its front edge projecting beyond the roller 23 overbalances it and starts it down the inclined guide 27 against the downwardly traveling apron 29, the speed of which is sufficient to immediately complete the turning of the piece of work to bring its uncut edge downwardly into the extension of the return feed passageway, where such edge bears on the conveyer belt 30 traveling in the direction of the jointer. The work is speedily conveyed by the belt 30 to the return feed passageway through the jointer, a guide bracket 36 being provided to bridge the gap between the guide wall afforded by the downwardly traveling apron 29 and the side bar 13 of the jointer.

By means of this invention the transfer of the work from one work-feed passageway to the other is accomplished mechanically and expeditiously without danger of jamming the machine. The speed of travel of the belts is such as to remove one piece of work before another is dropped even when the shortest pieces are used. Should a short piece of work follow a long strip it may find the return feed passageway occupied when it reaches the top of the inclined conveyer, but it will be held in this position with the apron slipping beneath it until the passageway is clear and then, by its engagement with the downwardly traveling apron 29, will be dropped into said passageway and conveyed to the return feed of the jointer.

What I claim as new and desire to secure by Letters Patent is:

1. A return feeder for continuous feed jointers and the like having work-feeding passageways extending in opposite directions, a guide having a narrow work-supporting ledge to receive the work from the first work-feeding passageway, an inclined conveyer upon which the work falls from the guide, and a conveyer receiving the work from the elevating conveyer for delivering it to the return work feed passageway of the machine.

2. A return feeder for continuous feed jointers and the like having work-feeding passageways for feeding work in opposite directions, a guide having a narrow work-supporting ledge to receive work from one work-feeding passageway, a clamping means engaging the work as it leaves said work-feeding passageway, an inclined elevating conveyer belt upon which the work falls when it passes the clamping means, and a return conveyer receiving the work from the elevating conveyer belt for delivering it to the return work-feed passageway of the machine.

3. A return feeder for continuous feed jointers and the like having work-feeding passageways through which work travels in opposite directions, an inclined conveyer for receiving the work as it issues from one work-feeding passageway, a downwardly traveling apron against which the work engages when it passes over the end of the inclined conveyer and by means of which it is inverted, and a return conveyer for conducting the work in its inverted position to the return feed passageway.

4. A return feeder for continuous feed jointers and the like having work-feeding passageways for feeding work in opposite directions, an inclined conveyer for receiving work as it issues from one work-feeding passageway, an oppositely inclined guide over which the work travels when it reaches the upper end of the inclined conveyer, a vertical guide communicating therewith, a downwardly traveling apron against which the work engages to be inverted and moved to a passageway formed between said apron and the vertical guide, and a conveyer belt forming the bottom of said passageway for conducting the work to the return feed passageway of the machine.

5. A return feeder for continuous feed jointers and the like having work feeding passageways through which work is fed in opposite directions, an adjustably mounted guide having a work-supporting ledge adapted to be aligned with one of the work-feeding passageways of the machine to receive the work issuing therefrom, a clamping member bearing against the work on said guide, an inclined conveyer upon which the work falls from the ledge of the guide when it passes beyond the clamp, an oppositely inclined guide receiving the work from the upper end of the inclined conveyer, a vertical guide and a downwardly traveling apron forming a work passageway between them, said apron serving to invert the work and carry it to said passageway, and a conveyer belt forming the bottom of said passageway for delivering the work to the return feed passageway of the machine.

6. A return feeder for continuous feed jointers and the like having work-feeding passageways through which the work travels in opposite directions, work-elevating means in position to receive the work as it issues from one passageway of the machine, separate means for inverting the work, and a return conveyer receiving the work from the inverting means and conducting it to the return passageway of the machine.

7. A return feeder for continuous feed jointers and the like having work-feeding passageways through which work travels in opposite directions, means for elevating the work in conveying it from one passageway to the other, and separate means for inverting the work while it is supported by the elevating means.

8. A return feeder for continuous feed jointers and the like having work-feeding passageways through which the work travels in opposite directions, a work guide and support receiving the work standing on its edge from one work passageway, an upright transverse wall, spring clamping means thereon engaging the work and holding it against the work guide, an inclined elevating conveyer receiving the work when it falls from the support after passing the spring clamping means, and a work-feeding passageway in line with the return feeding passageway of the machine adapted to receive the work as it turns over the end of the elevating conveyer, said wall serving to retain against longitudinal movement a piece of work delivered by the elevating conveyer while said work-feeding passageway is occupied.

9. A return feeder for continuous feed jointers and the like having work-feeding passageways of adjustable width for feeding work in opposite directions, an adjustably mounted supporting guide for alignment with one work-feeding passageway to receive and support the work issuing therefrom, an elevating conveyer receiving the work which falls off of said guide and conducting it upwardly toward the vertical plane of the other passageway, a guide aligned with a wall of the other passageway of the machine, a downwardly traveling apron adjustably mounted to form between it and said guide an extension of the said other work-feeding passageway of the machine and adapted to receive the work from the elevating conveyer in an inverted position, and an adjustably mounted conveyer for conducting the work in such position to the return work-feeding passageway of the machine.

10. A return feeder for continuous feed jointers and the like having work-feeding passageways through which the work travels in opposite directions, an inclined conveyer formed of belts of corrugated sheet rubber in position to receive the work as it issues from one work-feeding passageway of the machine, a downwardly traveling apron formed of belts of corrugated sheet rubber in the path of the work as it travels over the upper end of the elevating conveyer for inverting the work and directing it downwardly, and a conveyer belt for conducting the inverted work to the return work-feeding passageway of the machine.

In testimony whereof I affix my signature.

ANTON G. STUEDEMAN.